WITNESSES,

INVENTOR

Frederick Grinnell

BY Hilmarth K. Thurston
ATT'Y.

No. 792,258.

Patented June 13, 1905.

UNITED STATES PATENT OFFICE.

FREDERICK GRINNELL, OF NEW BEDFORD, MASSACHUSETTS, ASSIGNOR TO GENERAL FIRE EXTINGUISHER COMPANY, OF NEW YORK, N. Y., A CORPORATION OF NEW YORK.

VALVE APPARATUS.

SPECIFICATION forming part of Letters Patent No. 792,258, dated June 13, 1905.

Application filed July 11, 1899. Serial No. 723,517.

*To all whom it may concern:*

Be it known that I, FREDERICK GRINNELL, of New Bedford, county of Bristol, and State of Massachusetts, have invented certain new and useful Improvements in Valve Apparatus; and I do hereby declare the following specification, taken in connection with the accompanying drawings, forming a part of the same, to be a full, clear, and exact description thereof.

The invention relates to valves through which a fluid-pressure is supplied, and more especially to means for operating an indicator or alarm when said valve is closed or partially closed to shut off or reduce the effective supply of liquid.

The invention may be employed in connection with any suitable form of valve and in any desired relation and is of especial advantage in fire-sprinkler systems where it is of great importance that the supply-valve shall not be unintentionally left closed or be closed by malicious persons without the fact that the valve is closed or has been tampered with being brought to the attention of the proper persons.

The object of the invention is to provide a simple and efficient means for indicating that the supply-valve is not in the proper condition for the passage therethrough of the proper amount of fluid; and to that end the invention consists in the features and combination hereinafter described, and set forth in the claims.

Figure 1:
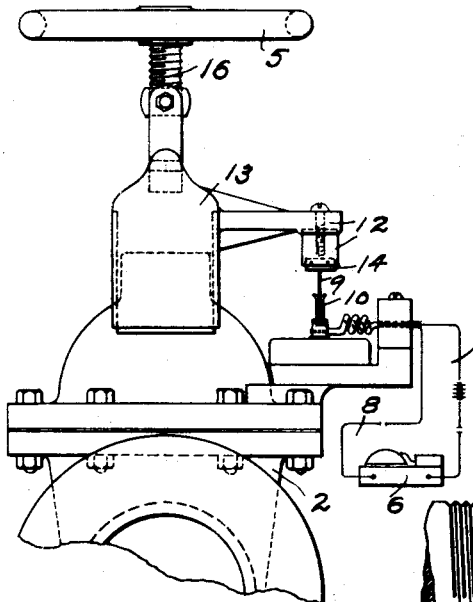
Figure 2:
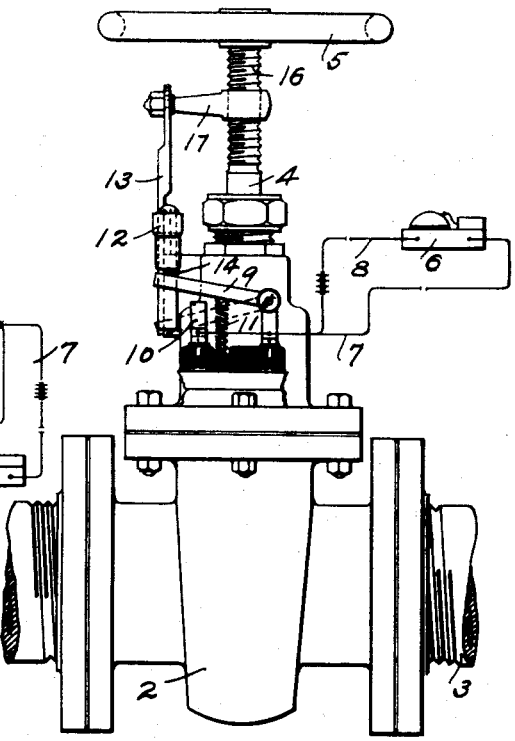

In the accompanying drawings, Figure 1 is an elevation showing an apparatus embodying the present improvements. Fig. 2 is a view looking toward the left in Fig. 1, and Fig. 3 is an elevation showing a modified form of apparatus embodying the invention.

Referring to the drawings in detail, the fluid is conducted from the source of supply through a pipe 1 and valve 2, which regulates or controls the supply of fluid to the pipe 3, leading to the sprinkler system or other place of distribution or use. The valve is provided with an operating valve rod or stem 5, by which said valve is opened or closed. The valve indicated in the drawings is the ordinary "Chapman" valve, in which the valve rod or stem has merely a movement of rotation in opening and closing the valve; but this valve is shown merely for the purpose of illustration, and it will be understood that other forms of valve may be employed—as, for instance, a form of valve in which the valve-rod moves longitudinally as well as rotates in operating the valve.

With the present invention an electrically-operated indicator, preferably in the form of an electric bell, is located at a convenient place where it is within the sight or hearing of the proper person—as, for instance, in the office of an establishment equipped with an automatic sprinkler system—and the current for operating this indicator is controlled by the valve-operating mechanism, so that an alarm is given whenever the supply of water or other fluid is cut off by the manipulation of the supply-valve. As shown, the circuit of the indicator is normally open and is closed by a circuit-closer or switch included in the circuit and operated by the mechanism for operating the valve. The indicator 6 in the form of an electric bell may, as before stated, be situated in any convenient place and is connected by the wires 7 and 8 with a switch located at the valve and operated to close the circuit when the supply-valve is closed. This switch may be of any suitable form, and, as shown, consists of a contact-blade 9, connected to the wire 7, and contact-plates 10, connected to wire 8, the blade being normally held out of engagement with the plates by a spring 11. The end of the blade 9 is engaged by an arm 12, projecting from a slide 13, mounted on guides formed on the valve 2, so that when said slide is moved downward the blade will be forced between the contact-plates 10 and complete the indicator-circuit, causing the bell 6 to be rung. The arm 12 is provided with a plate 14, of insulating material, for engaging blade 9, and said blade and the contact-plates 10 are suitably insulated by being secured to a block 15 of insulating materal. The slide 13 is operated by a screw-thread 16 on the rod 4, which engages an internal screw-thread in an arm 17, the outer end of which is secured to the slide 13. When the rod 4 is turned to close the valve 2 and shut off the supply to the system, the slide 13 is moved down to operate the switch and ring the alarm, thus indicating at the office or other desired place that the supply of water or other fluid is cut off at the supply-valve. When the valve is open or in proper condition for the proper supply of fluid to the system, the circuit is open and the bell does not ring. It is desirable in employing the invention in connection with sprinkler systems to so arrange the devices for operating the switch that the alarm will ring when the valve is partially closed, since if the valve is left only partially open the water-supply may be so reduced as to affect the efficiency of the system should a fire open the sprinklers.

Figure 3:
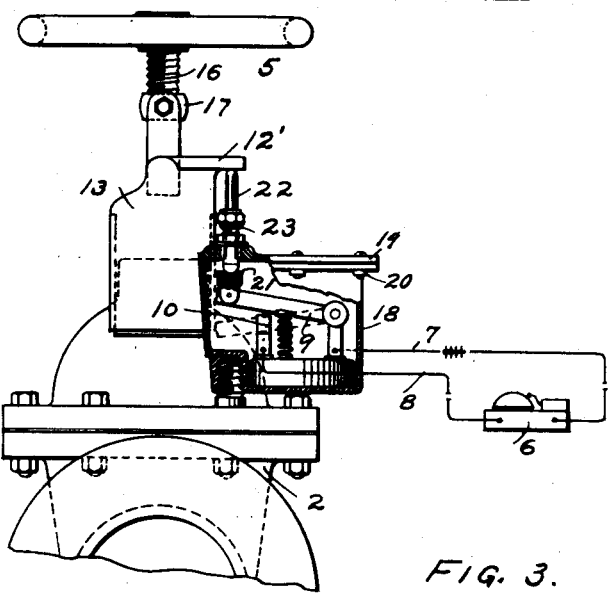

Under some conditions the supply-valve may be located in a place where dirt and corrosion may affect the parts of the switch or where moisture may affect the insulation, and it is preferred, therefore, to inclose the switch in a casing which is preferably water-tight, and in Fig. 3 is shown one way of modifying the apparatus to accomplish this. In this apparatus the switch is of the same construction as that heretofore described and is mounted in a casing or box 18, secured to the valve 2. This casing is provided with a cover 19, which is secured thereto by bolts 20, a packing being preferably introduced between said cover and casing to make said casing water-tight. The blade 9 is provided with a block of insulating material 21, which is engaged by the end of a plunger 22. The plunger 22 passes through a stuffing-box 23 on the cover 19, and its upper end is engaged by an arm 12', secured to a slide 13, which is operated from the valve-rod 4, as in the apparatus before described.

What I claim as my invention, and desire to secure by Letters Patent, is—

1. The combination, with a manually-operated valve through which fluid is supplied, of an electrically-operated indicator, an electric circuit therefor, a switch in said circuit, and means operated by the valve-actuating mechanism for operating said switch when the valve is moved from the position of fully open, substantially as described.

2. The combination, with a manually-operated valve through which fluid is supplied, of an electrically-operated indicator, an electric circuit therefor, a switch in said circuit, and means adjustably mounted on the valve-rod for operating said switch when the valve is moved from the position of fully open, substantially as described.

3. The combination with a manually-operated valve through which fluid is supplied, of an electrically-operated indicator, an electric circuit therefor, a switch in said circuit, and an adjustable arm operating said switch and operated by the valve-rod in closing the valve.

4. The combination with a manually-operated valve through which fluid is supplied, of an electrically-operated indicator, an electric circuit therefor, a switch in said circuit, a slide operated by the valve-rod in closing the valve, and connections between said slide and switch.

5. The combination with a manually-operated valve through which fluid is supplied, of an electrically-operated indicator, an electric circuit therefor, a switch in said circuit, a casing inclosing said switch, a plunger extending through said casing for operating said switch, and connections between said plunger and the valve-operating mechanism.

6. The combination with a manually-operated valve through which liquid is supplied, of an electrically-operated indicator, an electric circuit therefor, a switch in said circuit, a casing inclosing said switch, a stuffing-box on said casing, a plunger extending through said stuffing-box for operating said switch, and an arm operating said plunger and operated by the valve-rod.

FREDERICK GRINNELL.

Witnesses:
R. A. BATES,
W. H. THURSTON.